(12) United States Patent
Gambino et al.

(10) Patent No.: US 9,659,835 B1
(45) Date of Patent: May 23, 2017

(54) TECHNIQUES FOR INTEGRATING THERMAL VIA STRUCTURES IN INTEGRATED CIRCUITS

(71) Applicant: GLOBALFOUNDRIES INC., Grand Cayman (KY)

(72) Inventors: Jeffrey P. Gambino, Westford, VT (US); Richard S. Graf, Falmouth, ME (US); Sundeep Mandal, Bangalore (IN)

(73) Assignee: GLOBALFOUNDRIES INC., Cayman Islands (KY)

( * ) Notice: Subject to any disclaimer, the term of this patent is extended or adjusted under 35 U.S.C. 154(b) by 0 days.

(21) Appl. No.: 15/094,026

(22) Filed: Apr. 8, 2016

(51) Int. Cl.
*H01L 27/02* (2006.01)
*H01L 23/36* (2006.01)
*H01L 23/367* (2006.01)
*G06F 17/50* (2006.01)

(52) U.S. Cl.
CPC ........ *H01L 23/3677* (2013.01); *G06F 17/505* (2013.01); *H01L 27/0207* (2013.01); *G06F 2217/80* (2013.01)

(58) Field of Classification Search
CPC . H01L 2924/01079; H01L 2924/01078; H01L 2924/01013; H01L 2924/01029; H01L 2224/48091; H01L 27/02; H01L 27/02; H01L 27/0207; H01L 23/36; H01L 23/367; H01L 23/3677
USPC ......................................................... 257/720
See application file for complete search history.

(56) References Cited

U.S. PATENT DOCUMENTS 8,680,673 B2 *  3/2014  Shankar .............. H01L 23/3677
                                                  257/213

* cited by examiner

*Primary Examiner* — Monica D Harrison
(74) *Attorney, Agent, or Firm* — Scully Scott Murphy and Presser; Frank Digiglio

(57) ABSTRACT

A technique for designing an integrated circuit includes placing standard cells across a first surface of a substrate of an integrated circuit (IC) design. At least two unoccupied regions are located across the first surface that do not include standard cells. Aspect ratios for one or more micro fill vias that can be placed in the at least two unoccupied regions are determined. The one or more micro fill vias are placed in the at least two unoccupied regions. Finally, one or more partial thermal vias are placed from a second surface of the integrated circuit, opposite the first surface, to thermally couple the one or more partial thermal vias to the one or more micro fill vias to create thermal paths from the first surface to the second surface.

22 Claims, 9 Drawing Sheets

TECHNIQUES FOR INTEGRATING THERMAL VIA STRUCTURES IN INTEGRATED CIRCUITS

BACKGROUND

The present disclosure is generally directed to integrated circuits and, more specifically, to techniques for integrating thermal via structures in integrated circuits.

Switching transistors in an active portion of an integrated circuit (IC) generate a significant amount of heat. A portion of the generated heat is transferred to a substrate of the IC which, like the active portion of the IC, heats up. Thermal vias (e.g., through-silicon vias (TSVs)) can be used to transfer heat from an active portion of an IC to a heat sink through a substrate of the IC at a relatively fast rate. However, thermal TSVs may occupy a relatively significant amount of surface area on an active side of an IC and, as such, may not be particularly efficient from a real estate utilization perspective. The lack of efficient real estate utilization is primarily attributable to aspect ratio (width-to-height) requirements of TSVs.

BRIEF SUMMARY

Disclosed are techniques for integrating thermal via structures in integrated circuits. The techniques may be implemented as a method, in an integrated circuit of a data processing system, and/or as a computer program product embodied in a computer-readable storage device. The computer program product may include an electronic design automation (EDA) tool and/or one or more design files (e.g., EDA files).

A technique for designing an integrated circuit includes placing standard cells across a first surface of a substrate of an integrated circuit (IC) design. At least two unoccupied regions are located across the first surface that do not include standard cells. Aspect ratios for one or more micro fill vias that can be placed in the at least two unoccupied regions are determined. The one or more micro fill vias are placed in the at least two unoccupied regions. Finally, one or more partial thermal vias are placed from a second surface of the integrated circuit, opposite the first surface, to thermally couple the one or more partial thermal vias to the one or more micro fill vias to create thermal paths from the first surface to the second surface.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
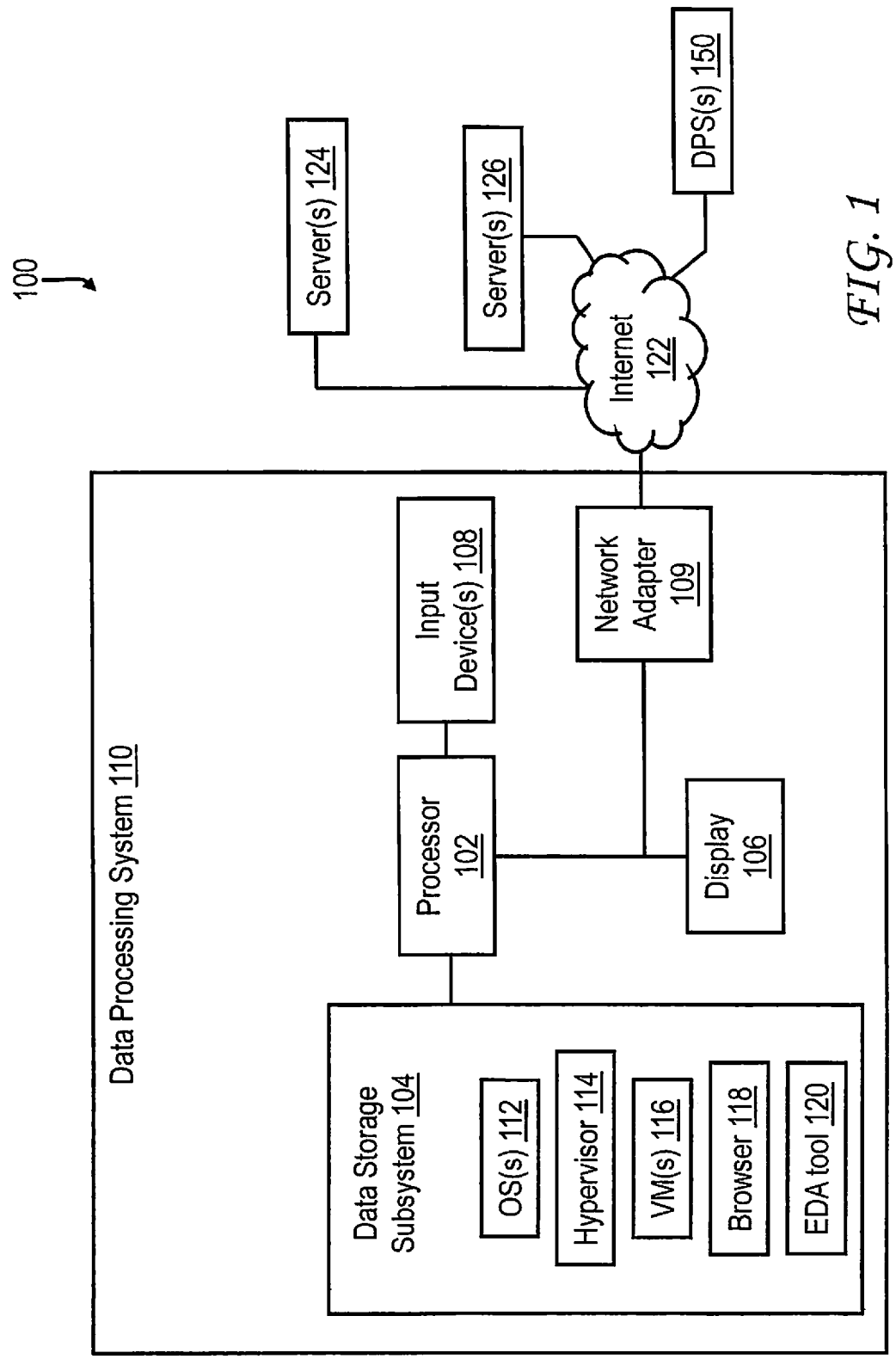
FIG. 1 is a diagram of a relevant portion of an exemplary data processing system environment that implements one or more integrated circuits (ICs) that include thermal via structures and/or executes an electronic design automation (EDA) tool that is configured according to the present disclosure to incorporate one or more thermal via structures in an IC design.

The illustrative embodiments disclose techniques for integrating thermal via structures in integrated circuits (ICs). The techniques may be implemented as a method, in an integrated circuit of a data processing system, and/or as a computer program product embodied in a computer-readable storage device. The computer program product may include an electronic design automation (EDA) tool and/or one or more design files (e.g., EDA files).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the term "partial thermal via" refers to a thermal via that is formed from a back side of an IC that does not extend completely through a substrate of the IC. As is also used herein, the term "micro fill via" refers to a via that is formed from a front side of an IC that does not extend completely through a substrate of the IC. The micro fill vias and the partial thermal vias are thermally coupled to transfer heat from a front side of the IC to a back side of the IC. The partial thermal vias may be thermally coupled to a heat sink.

According to aspects of the present disclosure, partial thermal vias are efficiently implemented in conjunction with micro fill vias within an integrated circuit (IC) without imposing conventional IC area requirements. According to one aspect of the present disclosure, micro fill vias are created between standard cells (active devices) from a front (active) side of an IC. In one or more embodiments, micro fill vias are dimensioned to fit between standard cells of an IC design. Thermal vias are then created from a back (substrate) side of a die and thermally coupled to the micro fill vias to create a thermal link from the active side to the back side of the IC. In one or more embodiments, the thermal vias are also thermally coupled to a heat sink and may function as shields.

In general, embodiments of the present disclosure are directed to sizing and placing micro fill vias between standard cells that include active devices (e.g., transistors) from a front side of an IC (into a substrate of the IC) and thermally coupling the micro fill vias to one or more partial thermal vias created from a back side of the IC (into the substrate of the IC). In various embodiments, micro fill vias with appropriate dimensions and aspect ratios (i.e., height-to width) are created that penetrate a substrate of an IC to a minor depth from a front (active) side and one or more partial thermal vias are created from a back side of the IC into the substrate with an appropriate dimension and aspect ratio to thermally couple the thermal vias to the micro fill vias. In various embodiments, micro fill vias may have different dimensions and aspect ratios (depending on a region where the micro vias are placed) providing the micro fill vias are thermally coupled to a partial thermal via. As one example, a micro fill via may have an aspect ratio of 5 to 1 (e.g., for a via diameter of 0.5 micron a height of a micro fill via would be 2.5 microns) and a partial thermal via may have an aspect ration of 10 to 1 or more (e.g., for a via diameter of 1 micron a height of a micro fill via would be 10 microns).

According to one aspect to the present disclosure, micro fill vias are created from a front side of an IC with variable horizontal spacing (e.g., between any or all of the micro fill vias). In various embodiments, spacing between the micro fill vias is dependent on the availability of free space between placed active devices and associated local density. According to at least one embodiment, a width (e.g. a diameter of a cylindrical micro fill via) defines an aspect ratio of each micro fill via and may be variable. For example, the diameter of a given micro fill via may be dependent on the amount of free space available between placed active devices at a select localized region. In various embodiments, the above-described micro fill vias are formed between active devices, may each have variable dimensions and variable spacing, and connect to a partial thermal via formed from the backside of an IC die.

With reference to FIG. 1, an exemplary data processing environment 100 is illustrated that includes a data processing system 110 that is configured, according to one or more embodiments of the present disclosure, to include one or more ICs that include thermal via structures configured according to the present disclosure and/or to execute an electronic design automation (EDA) tool that incorporates one or more thermal via structures in an IC design. Data processing system 110 may take various forms, such as workstations, laptop computer systems, notebook computer systems, desktop computer systems or servers and/or clusters thereof.

Data processing system 110 includes one or more processing units or processors 102 (each of which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 112 for data processing system 110. Data storage subsystem 104 may also include a hypervisor (or virtual machine monitor (VMM)) 114 for managing one or more virtual machines (VMs) 116 instantiated by different OS images, and application programs, such as a browser 118 (which may optionally include customized plug-ins to support various client applications), and an EDA tool 120.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems (DPSs) 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
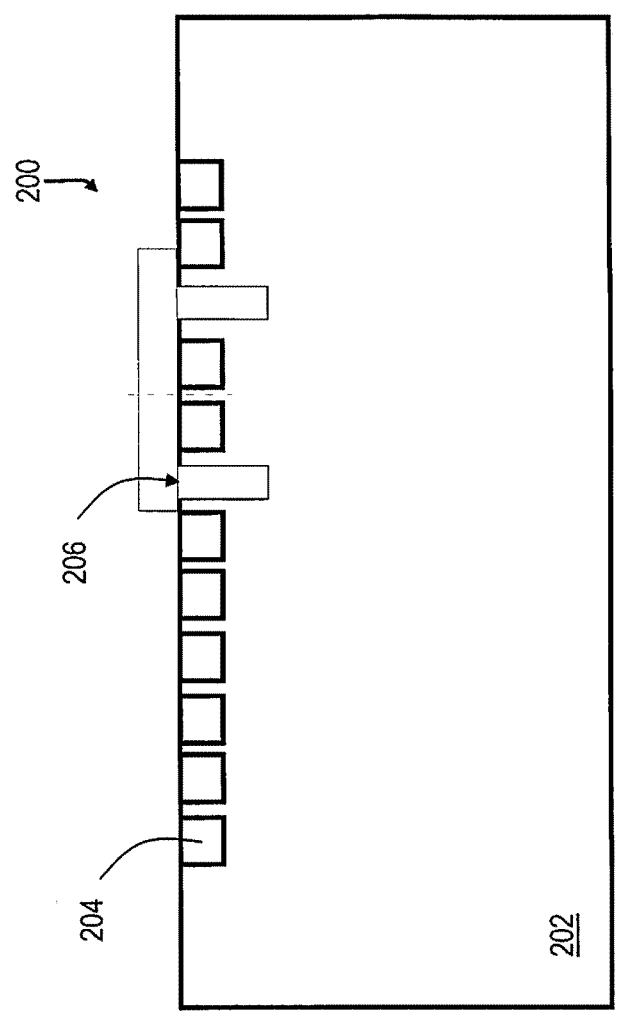
FIGS. 2-7 depict relevant cross-sectional portions of a substrate of an IC illustrating the creation of thermal via structures in the IC, according to an embodiment of the present disclosure.

Referring now to FIGS. 2-7, a chronological sequence of cross-sectional views of a substrate of an IC are given, illustrating the creation of thermal via structures in the IC according to an embodiment of the present disclosure. With reference first to FIG. 2, an exemplary IC 200 is illustrated in which micro trenches (holes) 206 have been created (etched) in substrate 202 from a front (active) side of substrate 202 between standard cells (i.e., active devices) 204. For example, substrate 202 may be a silicon substrate. In various embodiments, aspect ratios of holes 206 are selected to fit between standard cells 204 and extend into substrate 202 such that respective micro fill vias 212 (formed in holes 206) may be coupled to a partial thermal via 220 formed from a back side of substrate 202.

Figure 3:
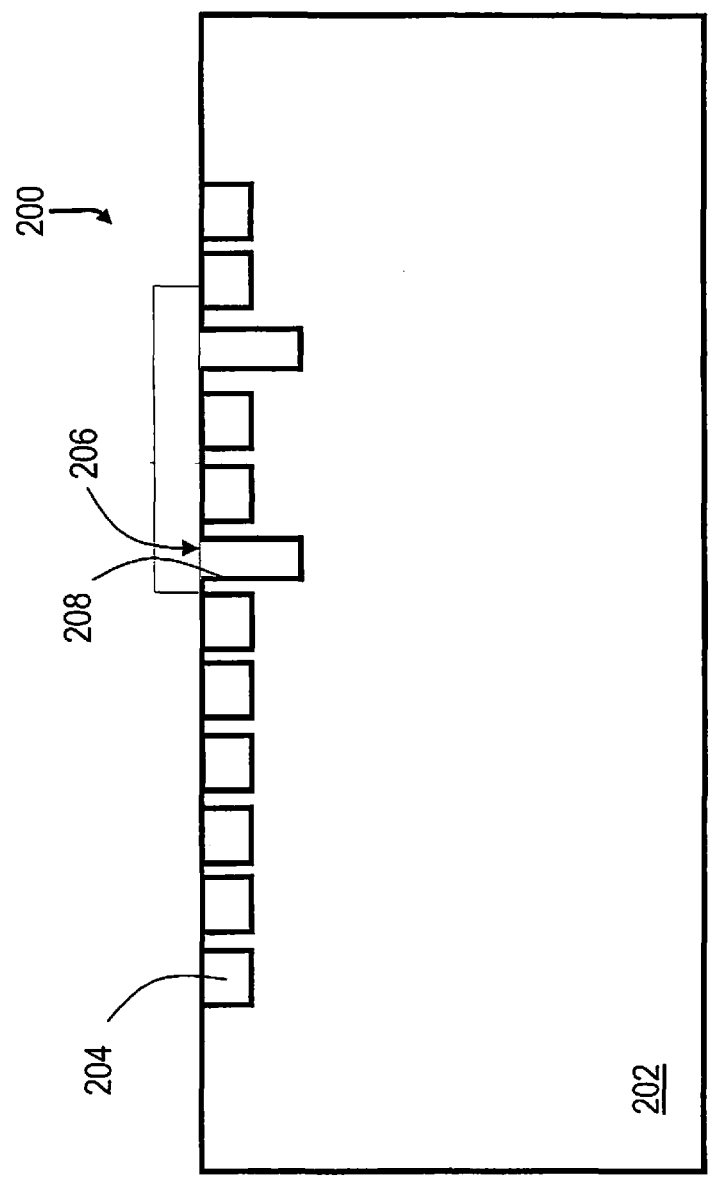
Figure 4:
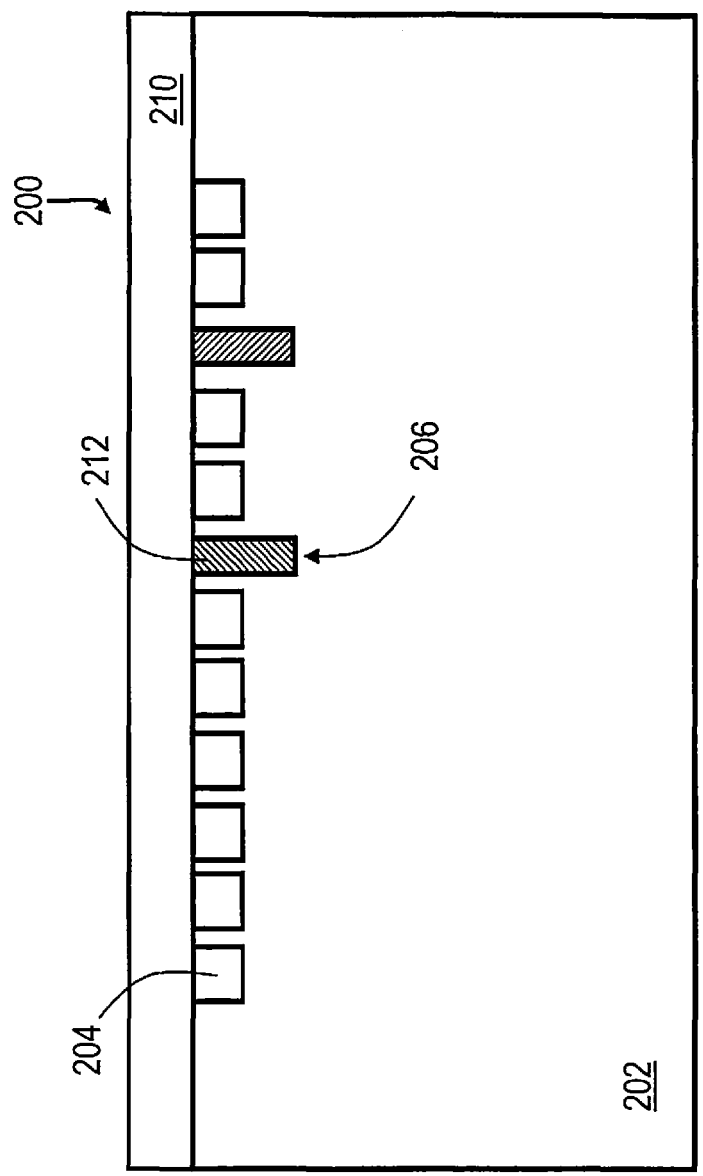

As is illustrated in FIG. 3, a barrier layer 208 is then deposited in holes 206 formed in IC 200. For example, in at least one embodiment, barrier layer 208 may be a titanium nitride (TiN) layer. FIG. 4 illustrates that, following deposition of barrier layer 208, holes 206 are filled with a metal (e.g., tungsten (W)) to create micro fill vias 212 in holes 206. A back end of line (BEOL) layer 210 may be created at a same time or a different time as holes 206 are filled (depending on the material utilized to fill holes 206). In any case, holes 206 are filled to create micro fill vias 212. BEOL layer 210 provides electrical interconnects for devices in standard cells 204.

Figure 5:
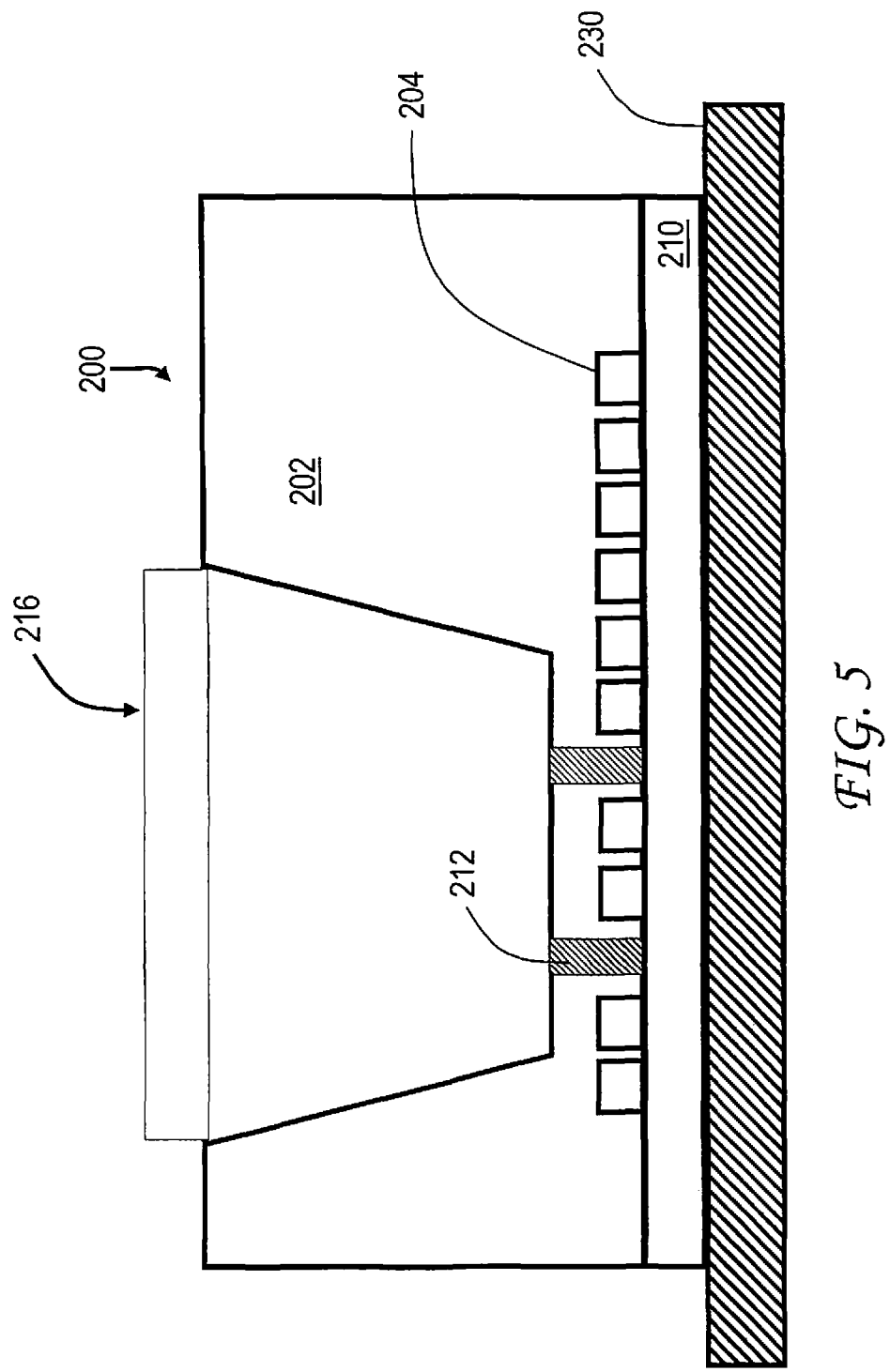
Figure 6:
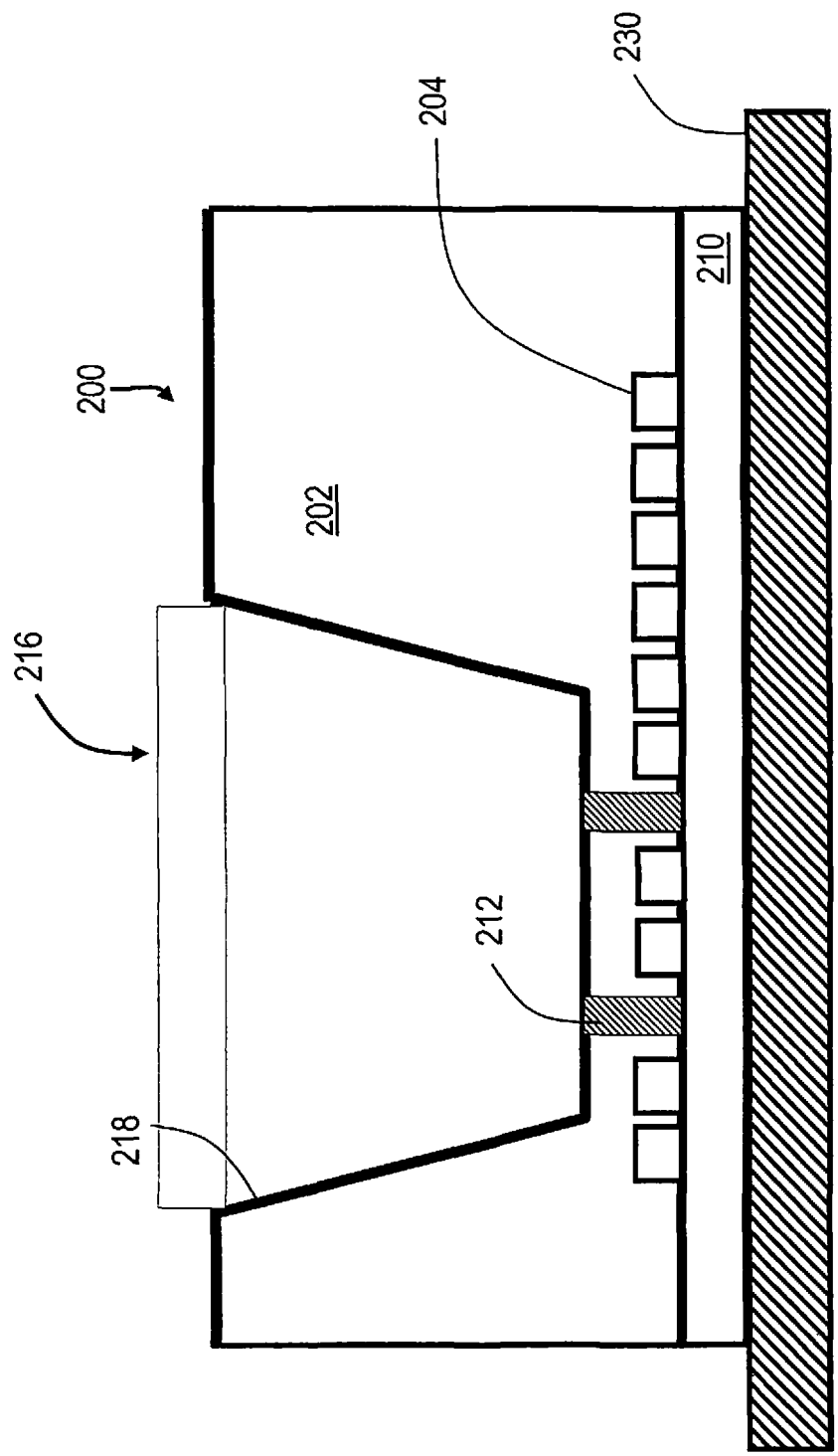
Figure 7:
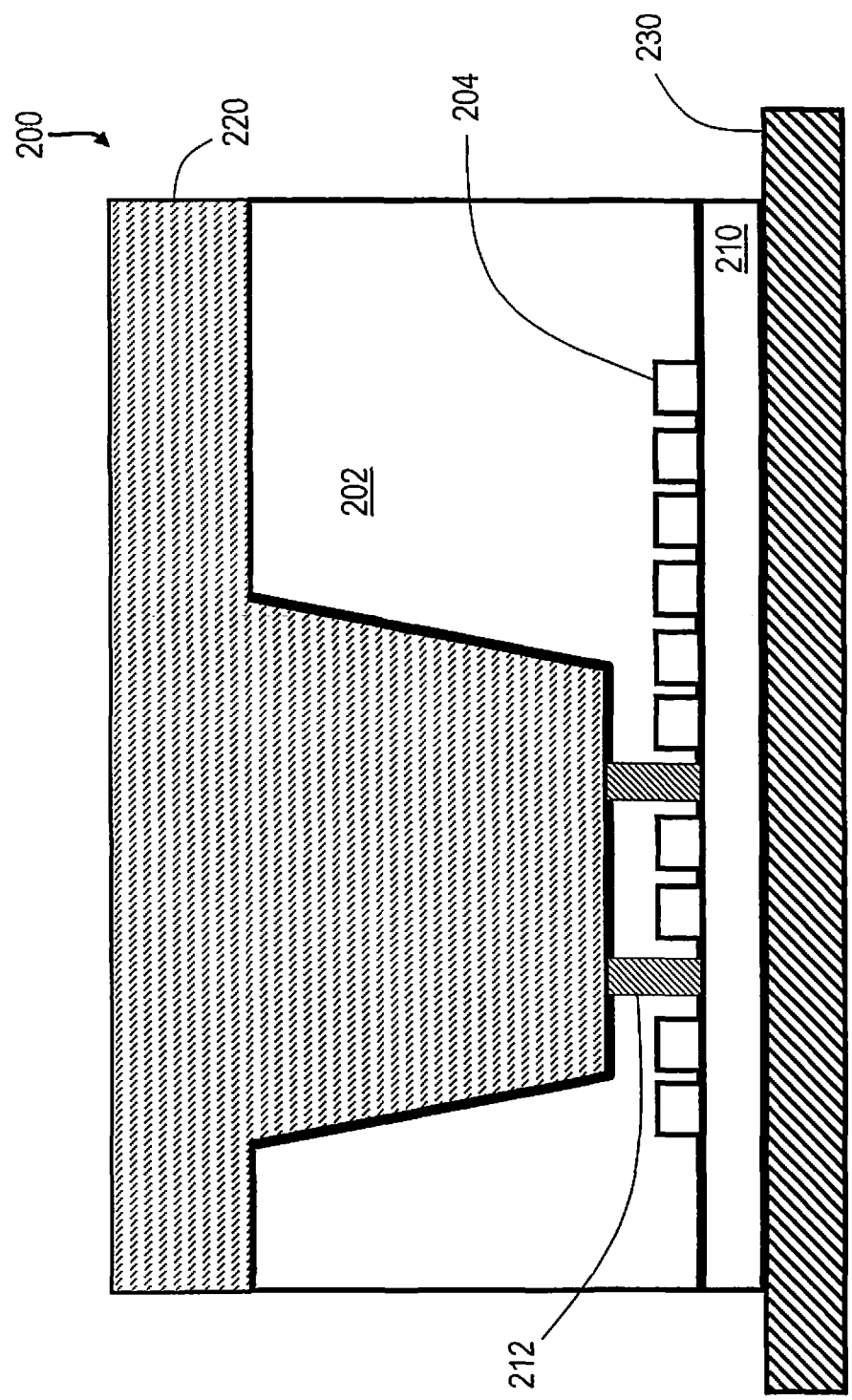

With reference to FIG. 5, processing of exemplary IC 200 continues with the creation of a trench 216 in substrate 202 from a back (non-active) side of substrate 202 at a location that is selected to coincide with micro fill vias 212. Trench 216 may be formed, for example, by etching. As is illustrated in FIG. 6, a seed layer 218 is then deposited in trench 216. For example, seed layer 218 may be a titanium (Ti)/titanium nitride (TiN) layer that also functions as a barrier layer when trench 216 is filled with copper (Cu), as copper (Cu) will diffuse into substrate 202 unless a barrier layer is utilized. As is illustrated in FIG. 7, trench 216 is then filled with a metal (e.g., copper (Cu)) to create a partial thermal via 220 in trench 216.

Figure 8:
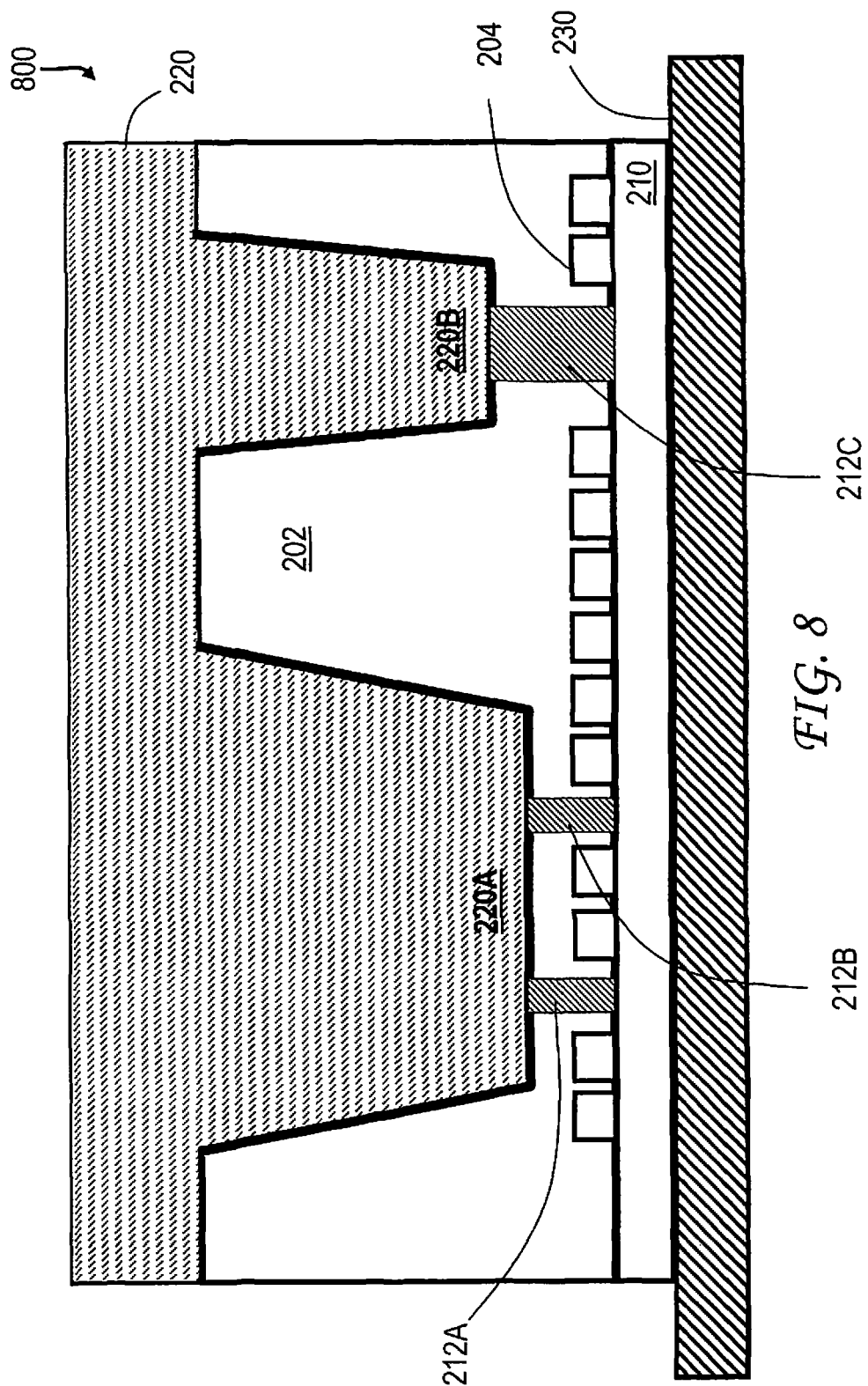
FIG. 8 depicts relevant cross-sectional portions of a substrate of an additional portion of the IC illustrating the creation of thermal via structures in the IC, according to another embodiment of the present disclosure.

With reference now to FIG. 8, a cross-section of an exemplary IC 800 is illustrated in which a partial thermal via 220 includes a first section 220A (that is thermally coupled to micro fill vias 212A and 212B) and a second section 220B (that is thermally coupled to micro fill via 212C). It should be appreciated that micro fill via 212C has a different aspect ratio than micro fill vias 212A and 212B and, as such, a depth of first section 220A is different than a depth of second section 220B. Micro fill vias 212 may, for example, replace dummy filler cells (fillers) that have traditionally been placed in regions that do not include standard cells to improve manufacturability (e.g., maintain component density and/or power bus continuity).

Figure 9:
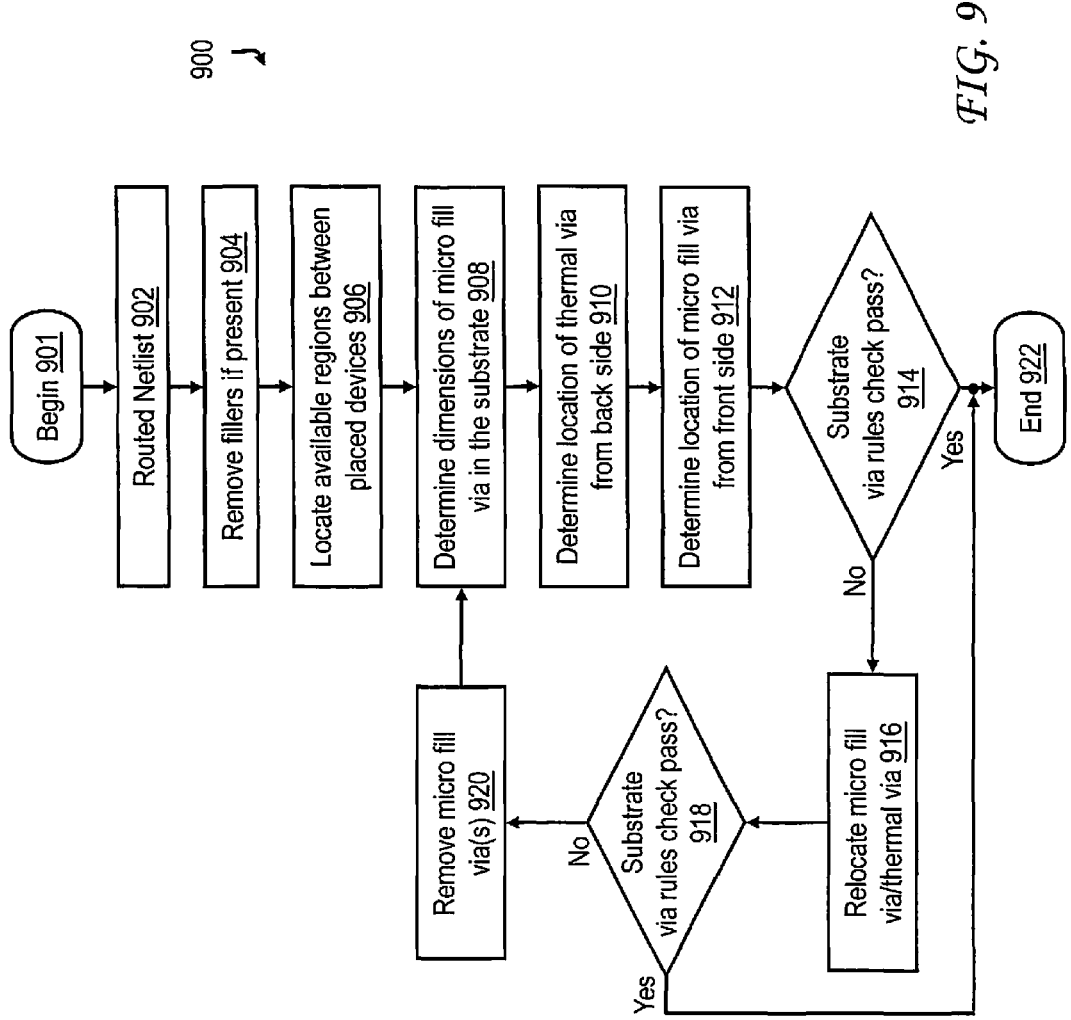
FIG. 9 is a flowchart of an exemplary process that may be implemented by an electronic design automation (EDA) tool to create thermal via structures in an IC design, according to an embodiment of the present disclosure.

With reference to FIG. 9, a process 900 for integrating micro fill vias 212 in an IC design is illustrated. For example, process 900 may be implemented by EDA tool 120 when executed on processor 102 of data processing system 100.

Process 900 of FIG. 9 begins at block 901 and then proceeds to block 902, which illustrates processor 102 accessing 902 a routed netlist, for example, in data storage subsystem 104 or from a remote server 124 or 126. Next, in block 904 filler cells (fillers), if present in the netlist, are removed from the netlist by processor 102. Then, in block 906, processor 102 locates available (empty) regions in the netlist that do not include standard cells 204 (i.e., processor 102 locates available regions between placed devices in the netlist). Next, in block 908, processor 102 determines dimensions of micro fill vias 212 in substrate 202. That is, processor 102 dimensions micro fill vias 212 to fit available localized space (i.e., regions that do not include standard cells 204) on substrate 202. Then, in block 910, processor 102 determines a location of one or more partial thermal vias 220 in the IC design from a back side of substrate 202. That is, processor 102 determines dimension and location of a partial thermal via 220 to connect to one or more micro fill vias 212 formed from the front side of substrate 202. Next, in block 912, processor 102 determines a location of one or more micro fill vias 212 from a front side of substrate 202.

Then, in decision block 914, processor 102 determines whether a substrate via rules check passes. In response to the substrate via rules check passing in block 914, control passes to block 922 where process 900 terminates and the modified IC design (routed netlist) is saved (e.g., to data storage subsystem 104 or a remote server 124, 126). In response to the substrate via rules check not passing in block 914, control passes to block 916 where processor 102 relocates one or more micro fill vias 212 and/or thermal vias 220. Then, in decision block 918, processor 102 determines whether the substrate via rules check passes. In response to the substrate via rules check passing in block 918, control passes to block 922 where processor 102 saves the modified routed netlist. In response to the substrate via rules check not passing in block 918, control passes to block 920 where processor 102 removes one or more micro fill vias 212. From block 920 control passes to block 908 where processor 102 again determines dimensions of one or more micro fill vias 212 in substrate 202.

Accordingly, techniques have been disclosed herein that advantageously integrate thermal via structures in an integrated circuit between standard cells while utilizing available space between the standard cells.

The present invention may be an integrated circuit, a system, and/or a method, and may exist as a computer program product in the form of an electronic design automation (EDA) tool and/or one or more EDA files. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of designing an integrated circuit, comprising:
   placing, by a data processing system, standard cells across a first surface of a substrate of an integrated circuit (IC) design;
   locating, by the data processing system, at least two unoccupied regions across the first surface that do not include standard cells;
   determining, by the data processing system, aspect ratios for one or more micro fill vias that can be placed in the at least two unoccupied regions;
   placing, by the data processing system, the one or more micro fill vias in that at least two unoccupied regions; and
   placing by the data processing system, one or more partial thermal vias from a second surface of the integrated circuit, opposite the first surface, to thermally couple the one or more partial thermal vias to the one or more micro fill vias to create thermal paths from the first surface to the second surface.

2. The method of claim 1, further comprising:
coupling a heat sink with the one or more partial thermal vias approximate the second surface.

3. The method of claim 1, where the micro fill vias include tungsten.

4. The method of claim 3, wherein a layer of titanium nitride is deposited on the substrate to provide a seed layer for the tungsten.

5. The method of claim 1, wherein the partial thermal vias include copper.

6. The method of claim 5, wherein a layer of titanium nitride is deposited on the substrate to provide a barrier layer to prevent the copper from diffusing into the substrate and also function as a seed layer.

7. The method of claim 1, wherein the partial thermal vias include tungsten.

8. The method of claim 7, wherein a layer of titanium nitride is deposited on the substrate to provide a seed layer for the tungsten.

9. The method of claim 1, wherein the substrate is a silicon substrate.

10. An integrated circuit, comprising:
a substrate;
active devices formed in a front side of the substrate, wherein first and second regions of the substrate do not include any of the active devices and have different respective areas;
one or more first micro fill vias formed in the first region;
one or more second micro fill vias formed in the second region, wherein the one or more first micro fill vias have a different aspect ratio than the one or more second micro fill vias; and
a partial thermal via formed in a back side of the substrate, wherein the partial thermal via is coupled to the first and second micro fill vias to provide a thermal path between the front and back sides of the substrate.

11. The integrated circuit of claim 10, further comprising:
a heat sink in contact with the partial thermal via.

12. The integrated circuit of claim 10, wherein the first and second micro fill vias include tungsten.

13. The integrated circuit of claim 12, wherein a layer of titanium nitride is deposited on the substrate to provide a seed layer for the tungsten.

14. The integrated circuit of claim 10, wherein the partial thermal vias include copper.

15. The integrated circuit of claim 14, wherein a layer of titanium nitride is deposited on the substrate to provide a barrier layer to prevent the copper from diffusing into the substrate and also function as a seed layer.

16. The integrated circuit of claim 10, wherein the partial thermal vias include tungsten.

17. The integrated circuit of claim 16, wherein a layer of titanium nitride is deposited on the substrate to provide a seed layer for the tungsten.

18. The integrated circuit of claim 10, wherein the substrate is a silicon substrate.

19. The integrated circuit of claim 10, wherein the partial thermal via includes a first section thermally coupled to the one or more first micro fill vias and a second section thermally coupled to the one or more second micro fill vias wherein a depth of the first section is different than a depth of the second section.

20. A program product for creating thermal via structures in an integrated circuit design, comprising:
a storage device;
program code stored within the storage device that, when executed by a processor, causes a data processing system to perform;
locating available regions between placed devices in a routed netlist of an integrated circuit (IC) design;
determining dimensions of micro fill vias that fit in the available regions;
determining a location of a partial thermal via from a back side of the IC design;
determining a location of the micro fill vias from a front side of the IC design;
determining whether a substrate via rules check passes for the IC design when the partial thermal via and the micro fill vias are added to the routed netlist;
in response to the substrate via rules check not passing, relocating one or more of the micro fill vias and the partial thermal via in the IC design;
determining, subsequent to the relocating, whether the substrate via rules check passes for the one or more of the micro fill vias and the partial thermal via; and
in response to the substrate via rules check passing subsequent to the relocating, saving the routed netlist as modified to include the relocated one or more of the micro fill vias and the partial thermal via.

21. The program product of claim 20, wherein the program code, when executed, further causes the data processing system to perform:
in response to the substrate via rules check not passing subsequent to the relocating, removing the one or more micro fill vias from the routed netlist; and
initiating the determining dimensions of new micro fill vias that fit in the available regions.

22. An integrated circuit, comprising:
a silicon substrate;
active devices formed in a front side of the silicon substrate, wherein first and second regions of the silicon substrate do not include any of the active devices and have different respective areas;
one or more first micro fill vias formed in the first region;
one or more second micro fill vias formed in the second region; and
a partial thermal via formed in a back side of the silicon substrate, wherein the partial thermal via is coupled to the first and second micro fill vias to provide a thermal path between the front and back sides of the silicon substrate.

* * * * *